United States Patent [19]

Hirata et al.

[11] Patent Number: 5,398,329
[45] Date of Patent: Mar. 14, 1995

[54] SYSTEM FOR SWITCHING BETWEEN FIRST AND SECOND CONTROL UNIT AND BROADCASTING SWITCHOVER TO CONNECTING HOSTS INDICATING AVAILABILITY OF FIRST AND SECOND COMMUNICATION LINKS

[75] Inventors: Toshiaki Hirata, Kawasaki; Tatsuo Kawatobi, Yokohama; Kazuo Yagyu, Hiratsuka, all of Japan

[73] Assignee: Hitachi, Ltd., Tokyo, Japan

[21] Appl. No.: 615,305

[22] Filed: Nov. 19, 1990

[30] Foreign Application Priority Data

Nov. 22, 1989 [JP] Japan .................................. 1-302124

[51] Int. Cl.$^6$ .............................................. G06F 11/20
[52] U.S. Cl. ..................................... 395/575; 371/9.1; 364/228.3; 364/238.1; 364/238.2; 364/DIG. 1; 395/275
[58] Field of Search ................ 371/9, 8.1, 8.2, 9.1, 371/10.1; 364/187; 395/275, 575

[56] References Cited

U.S. PATENT DOCUMENTS

| | | | |
|---|---|---|---|
| 4,396,984 | 8/1983 | Videki, II | 395/575 |
| 4,747,130 | 5/1988 | Ho | 379/269 |
| 4,775,976 | 10/1988 | Yokoyama | 371/9 |
| 4,837,680 | 6/1989 | Crockett et al. | 395/275 |
| 5,119,488 | 6/1992 | Takamatsu et al. | 371/8.2 |

FOREIGN PATENT DOCUMENTS 63-54846 3/1988 Japan .

OTHER PUBLICATIONS

HITAC Manual, "Program Product VOS3 Communication Management SNF, Introduction and Practical Use", 8090-3-172, 63-7, 1988 (English translation unavailable).

*Primary Examiner*—Thomas C. Lee
*Assistant Examiner*—Sang Hui Kim
*Attorney, Agent, or Firm*—Fay, Sharpe, Beall, Fagan, Minnich & McKee

[57] ABSTRACT

In a communication system having a plurality of host computers and two communication control processors (CCPs) connected to the respective host computers, one CCP is used as a regular CCP and the other CCP as a backup CCP. Each host computer establishes links with the two CCPs. Each of the host computers has a link flag for each link connected to each of the CCPs. The flag is set when the link is connected to the regular CCP. When the master host computer detects failure of the regular CCP, the master host computer sends an activate node request to the backup CCP to indicate that the backup CCP should be activated. Upon reception of the activate node request, the backup CCP sends a change output link request to all of the host computers. Upon reception of the change output link request, each of the host computers sets the link flag corresponding to the backup CCP to deal with the backup CCP as a regular CCP.

12 Claims, 17 Drawing Sheets

F I G. 3
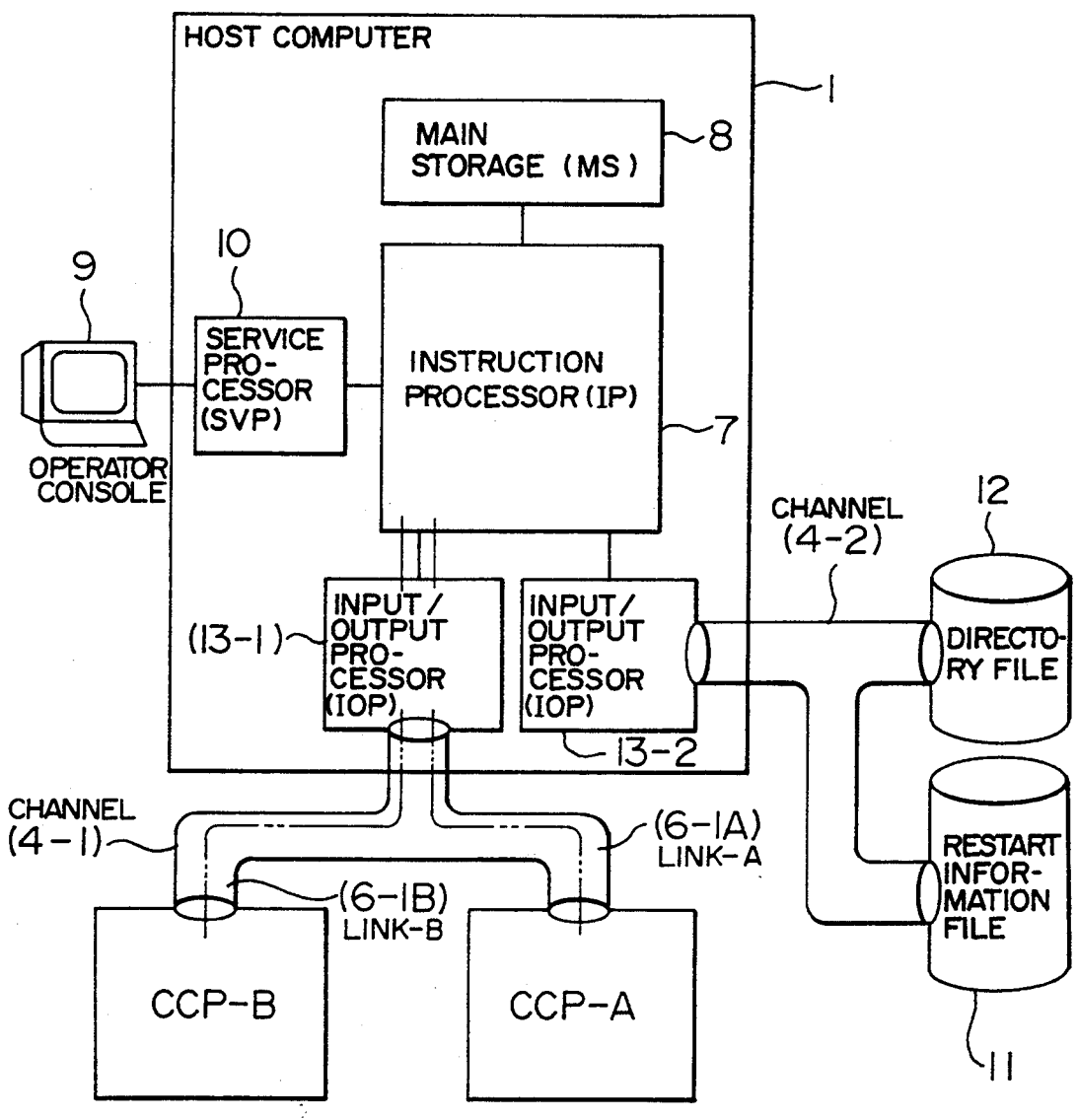

SYSTEM FOR SWITCHING BETWEEN FIRST AND SECOND CONTROL UNIT AND BROADCASTING SWITCHOVER TO CONNECTING HOSTS INDICATING AVAILABILITY OF FIRST AND SECOND COMMUNICATION LINKS

BACKGROUND OF THE INVENTION

The present relates to a method and a system of switching-over from a regular communication control processor (hereinafter abbreviated to "CCP") connected to a plurality of host computers to a backup CCP, and particularly relates to a method and a system of automatically switching-over from a regular CCP to a backup CCP in case of failure of the regular CCP.

A system having regular and backup CCPs connected to a plurality of host computers has been disclosed in HITAC manual "Program Product VOS3 Communication Management XNF, Introduction and Practical Use", 8090-3-172, 63-7 (1988), Hitachi, Ltd. One program is stored in both the regular and backup CCPs before a link state is established between the regular CCP and the respective host computers. In case of failure of the regular CCP in the system, all the communication lines connected to the regular CCP are manually switched over to the backup CCP through a line switch. Then, an operator command is issued from the respective host computers to release the link state established between the regular CCP and the respective host computers and establish a new link state between the backup CCP and the respective host computers to thereby perform switching-over for the regular CCP to the backup CCP (Prior Art 1).

On the other hand, a communication system in which dual-system CCPs are connected to each other through health check lines has been disclosed as "Load Distributed Communication Control Processor" in JP-A-6354846. In the system, one CCP monitors the state of the other CCP so that, in case of failure of one CCP, the communication line connected to the failure CCP is connected to the other CCP (Prior Art 2).

Now consider the case where the Prior Art 1 is applied to a communication system having a plurality of host computers operated on the basis of one program and separated into one master host computer and slave host computers, two CCPs of the same hardware construction separated into a regular CCP connected to the respective host computers to be operated on the basis of the program and a backup CCP, and a line switch for collectively switching lines between the two CCPs. In case of failure of the regular CCP, a long time is required for recovery from the failure because operator commands must be issued from all of the host computers connected to the new regular CCP which is changed from a backup CCP into a regular CCP (that is, human thought and operation must be used).

On the other hand, in the case where the Prior Art 2 is employed, health-check lines must be provided between the regular CCP and the backup CCP, so that wasteful physical resources are required. Further, it is necessary to newly provide a technique for informing the host computers that the CCP to be connected to the host computers should be a backup CCP.

SUMMARY OF THE INVENTION

An object of the present invention is to provide a high-speed automatic backup method for making switching-over between regular and backup CCPs connected to host computers without necessity of wasteful physical resources and without intervention of human operators, and a system therefor.

To attain the foregoing object, the automatic backup method and system according to the present invention has the following features.

(1) One program is preliminarily stored in two CCPs respectively used as a regular CCP and a backup CCP. Then, links are preliminarily established as logical communication paths between the respective host computers and the regular and backup CCPs. A link flag is provided for each of the links in each of the host computers. Each of the host computers performs message exchange for one link having the link flag set, that is, for a link for connection to the regular CCP. The master host computer sends an activate node request to the CCP used as a regular CCP. The CCP which has received the activate node request sends a change output link request to all of the host computers to be connected to the CCP. Each of the host computers which have received the change output link request sets the link flag with respect to the link for connection to the CCP. If the CCP which had been already activated at the time of the establishing of links between the host computers and the CCPs, the CCP can send the change output link request to the host computers using the established link.

(2) The master host computer checks the state of the CCP serving as a regular CCP, through operator commands. When a necessary program does not run, a program read from a file stored in the host computers is transferred to the CCP and stored in the CCP whereafter a link is established between the host computer and the CCP. On the other hand, the same program as that used for the regular CCP is forcedly transferred to the CCP serving as a backup CCP and stored in the CCP whereafter a link is established between the host computer and the CCP. Host computers except the master host computer are linked with the two CCPs through operator commands.

(3) Each of the host computers which have received the change output link request records the requester CCP as a regular CCP on a file of the host computer. The master host computer regards the CCP read from the file at the time of restarting after stopping, as a regular CCP. When an instruction is given through operator commands at the time of the restarting of the master host computer that configuration information on the file should not be reflected, the CCP predetermined by configuration definition of the program running on the host computers and the CCP is regarded as a regular CCP.

(4) The master host computer sends a health-check message to both the regular and backup CCPs and monitors answer messages corresponding to the health-check message in a predetermined time. When there is no answer from the regular CCP in the predetermined time, the master host computer sends an activate node request to the backup CCP to perform CCP switching-over by the means as described in the clause (1). When there is no answer from the backup CCP in the predetermined time, a failure message is displayed on a console connected to the host computer.

(5) When the CCP is recovered from the failure, the master host computer transfers the same program as that used for the regular CCP, to the CCP through operator commands and stored in the CCP whereafter a link is established between the host computer and the CCP to start failure monitoring as described in the clause (4). Host computers except the master host computer are linked with the CCP through operator commands, so that the CCP is kept on standby as a backup CCP.

According to the configuration as described in the above item (1), in case of failure of the regular CCP, the master host computer which has detected the failure sends an activate node request to the backup CCP. The CCP which has received the request sends a change output link request to all of the host computers to which the CCP is to be connected. Each of the host computers which has received the change output link request sets the link flag to perform message exchange between the host computer and the backup CCP linked with the host computer. Accordingly, the backup CCP can be newly operated as a regular CCP automatically without human power. Further, when the CCP has been already activated at the time of the establishing of a host computer-CCP link, a change output link request is sent to the host computers using the established link. Among the host computers connected to the CCP, even a later started one can know which is the regular CCP at the present time.

According to the configuration as described in the above item (2), a necessary program for the CCP to be operated as a regular CCP is transferred to the CCP only when the program does not run on the CCP. Further, the same program as that for the regular CCP is forcedly transferred to the backup CCP. Accordingly, the backup CCP can be securely kept on standby while processing is continued, even in the case where the regular CCP is operated.

According to the configuration as described in the above item (3), when information for exhibiting which is the regular CCP is recorded on a file in each of the host computers so that the master host computer can consult the information at the time of restarting after stopping, the host computers can know which is the regular CCP at the time of restarting after stopping of the master host computer. This is based on the fact that the regular and backup CCPs are never changed during the stopping of the master host computer.

According to the configuration described in the above item (4), the master host computer monitors failure of the backup CCP, as well as failure of the regular CCP, through health-check messages. Accordingly, measures counter to the failure of the backup CCP can be taken rapidly.

According to the configuration as described in the above item (5), when the CCP is recovered from the failure, the same program as that for the regular CCP is stored in the CCP before a link is established between the CCP and the respective host computers. Accordingly, the recovered CCP can be kept on standby.

BRIEF DESCRIPTION OF THE DRAWINGS

FIG. 3 is a view showing an example of the hardware configuration of a host computer;

DESCRIPTION OF THE PREFERRED EMBODIMENT

Figure 2:
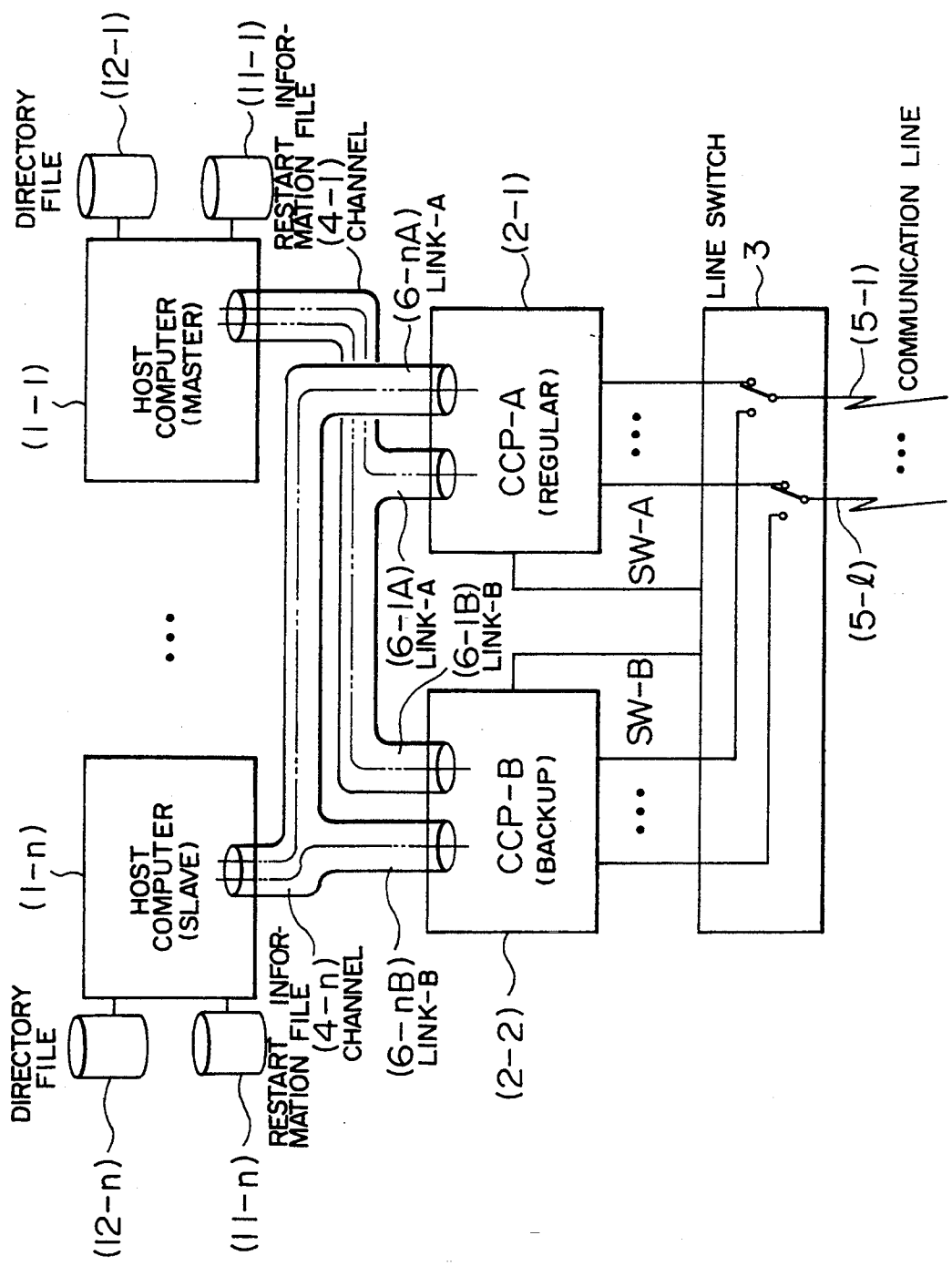
FIG. 2 is a view showing an example of the configuration of the CCP backup system.

Referring to FIG. 2, there is shown an example of the configuration of a communication control processor backup system as an embodiment of the present invention. Host computers 1 (1-1 to 1-n) are operated on the basis of a program. One of the host computers has an attribute of master, the others have an attribute of slave. Communication control processors (CCPs) 2 (2-1 to 2-n) have the same hardware configuration. One (2-1) of the two CCPs is operated as a regular CCP, the other (2-2) is kept on standby as a backup CCP. The host computers and the CCPs are connected by channels 4 (4-1 to 4-n), so that links 4 (4-1 to 4-n), so that links 6 (6-1A to 6-nA; 6-1B to 6-nB) as logical communication paths are established on the channels. The channels serve as means of physically transferring messages between the host computers and the CCPs. One host computer is connected to the two CCPs by one channel. The links are one-to-one correspondingly connected between the host computers and the CCPs to form logical communication paths for providing correct data transfer means therebetween. In short, two links A and B for connection to the respective CCPs exist as seen from the respective host computers. In this embodiment, special attention should be called to the fact that the respective host computers are linked with the two CCPs. A line switch 3 collectively switches between communication lines 5 (5-1 to 5-l) to be connected to the CCPs and the regular or backup CCPs. Line switching operations (SW-A and SW-B) can be made on the basis of instructions issued from the respective CCPs.

Hardware Configuration (Host)

Referring to FIG. 3, there is shown an example of the hardware configuration of a host computer. An instruction processor (IP) 7 executes a program to perform data communication and business processing. A main storage (MS) 8 stores programs, tables, and transmission and reception data. An operator console 9 is used for the double purpose of inputting operator commands and outputting messages to operators through a service processor (SVP) 10. Each of the host computers has a restart information file 11 in which information for discriminating between regular CCP and backup CCP is stored. Each of the host computers has a directory file 12 in which a communication control program running on the CCPs are stored in the form of a load module. The program is transferred to a CCP, stored in the CCP and then executed. I/O processors (IOP) 13 physically control data exchange to CCPs and files through connection thereto by the channels 4.

Hardware Configuration (CCP)

Figure 4:
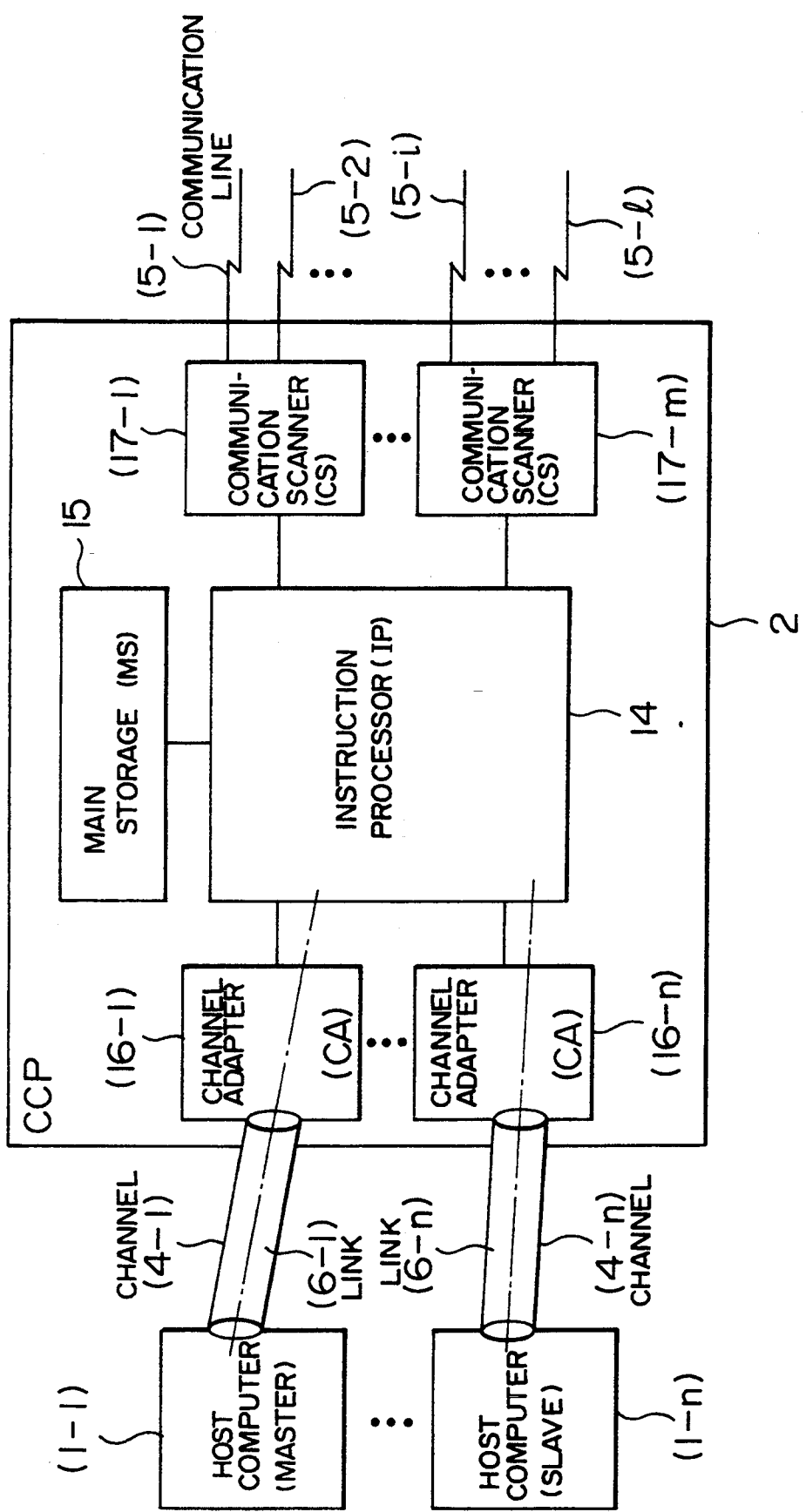
FIG. 4 is a view showing an example of the hardware configuration of a CCP.

Referring to FIG. 4, there is shown an example of the hardware configuration of a CCP. An instruction processor (IP) 14 executes a program to perform data communication. A main storage (MS) 15 stores programs, tables, and transmission and reception data. Channel adapters (CA) 16 control data exchange to the host computers through connection to the host computers by the channels 4. Communication scanners (CS) 17 control scanning of communication lines and data exchange to the communication lines.

Method of Deciding the Attribute of Host Computer

When the system is constructed, the attribute (master/slave) in each of the host computers is designated by the configuration definition of the program running on the host computers and CCPs. In case of failure of the master-attribute host computer, a slave-attribute host computer can be changed to the master-attribute host computer on the basis of an operator command.

Method of Deciding Regular/Backup

The regular/backup CCP is decided at the time of the starting of the master host computer on the basis of information recorded on the restart information file. Each of the host computers has the restart information file. The contents of the file are updated at the time of the initial setting of the backup system (at the time of the starting of a host computer except the master host computer or at the time of the starting of a CCP) or at the time of CCP switching-over. In the case where information recorded on the restart information file is not used, for example, at the time of the starting of the system just after the configuration of the system, "no use of the restart information file" is designated through an operator command and then the regular/backup CCP is decided on the basis of configuration definition information.

Status of CCP

Figure 1:
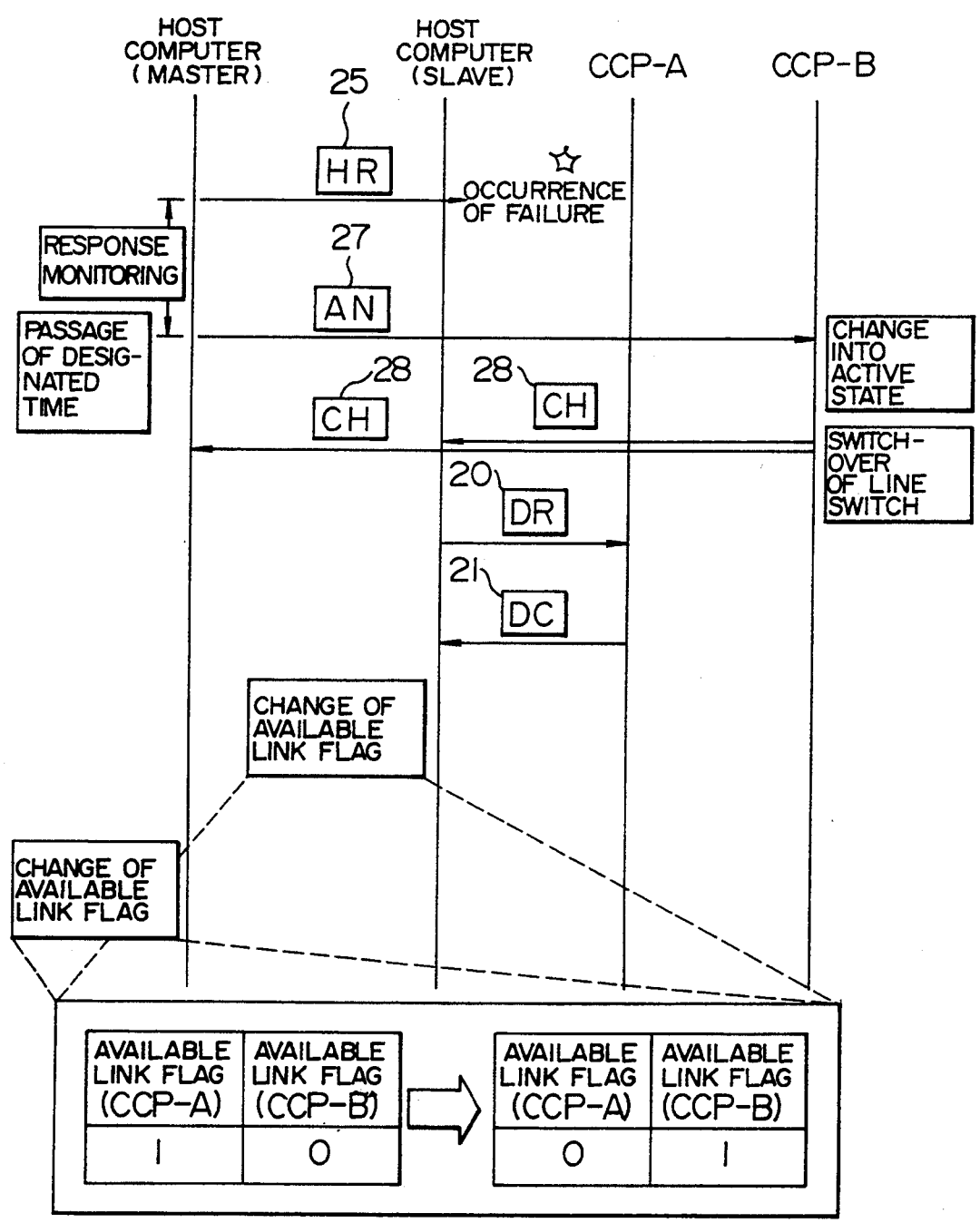
FIG. 1 is a view showing the procedure of switching-over from a regular CCP to a backup CCP in case of failure of the regular CCP in a backup system.

The status of the CCP is separated into an active status and an inactive status as related to the regular/backup state. Just after the program is stored in the CCP, the CCP is inactive. When an active node request (AN) 27 as shown in FIG. 1 is received from a host computer, the CCP is activated. Only the active-status CCP can be operated as a regular CCP.

Method of Establishing and Releasing Link

Figure 5:
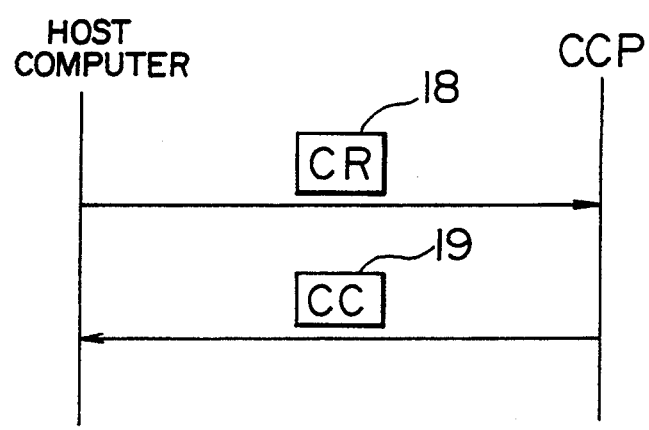
FIG. 5 is a view showing the procedure of establishing a host computer-CCP link.
Figure 6:
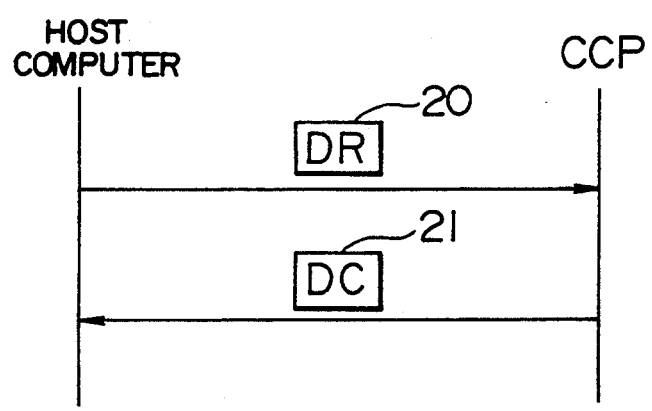
FIG. 6 is a view showing the procedure of releasing a host computer-CCP link.

An established state of the link is obtained by exchange of a connection request (CR) 18 and a connection confirm (CC) 19 between the host computer and the CCP as shown in FIG. 5 at the time of the starting of the host computer or CCP. On the other hand, a released state of the link is obtained by exchange of a disconnect request (DR) 20 and a disconnect confirm (DC) 21 as shown in FIG. 6 at the time of the stopping of the CCP. In the case where the DC is not received with the passage of a predetermined time after the transmission of the DR, or in the case where failure occurs in the established state of the link to make host computer-CCP communication impossible, the link is released without exchange of the aforementioned messages.

Link State and Link Management Method

Figure 7:
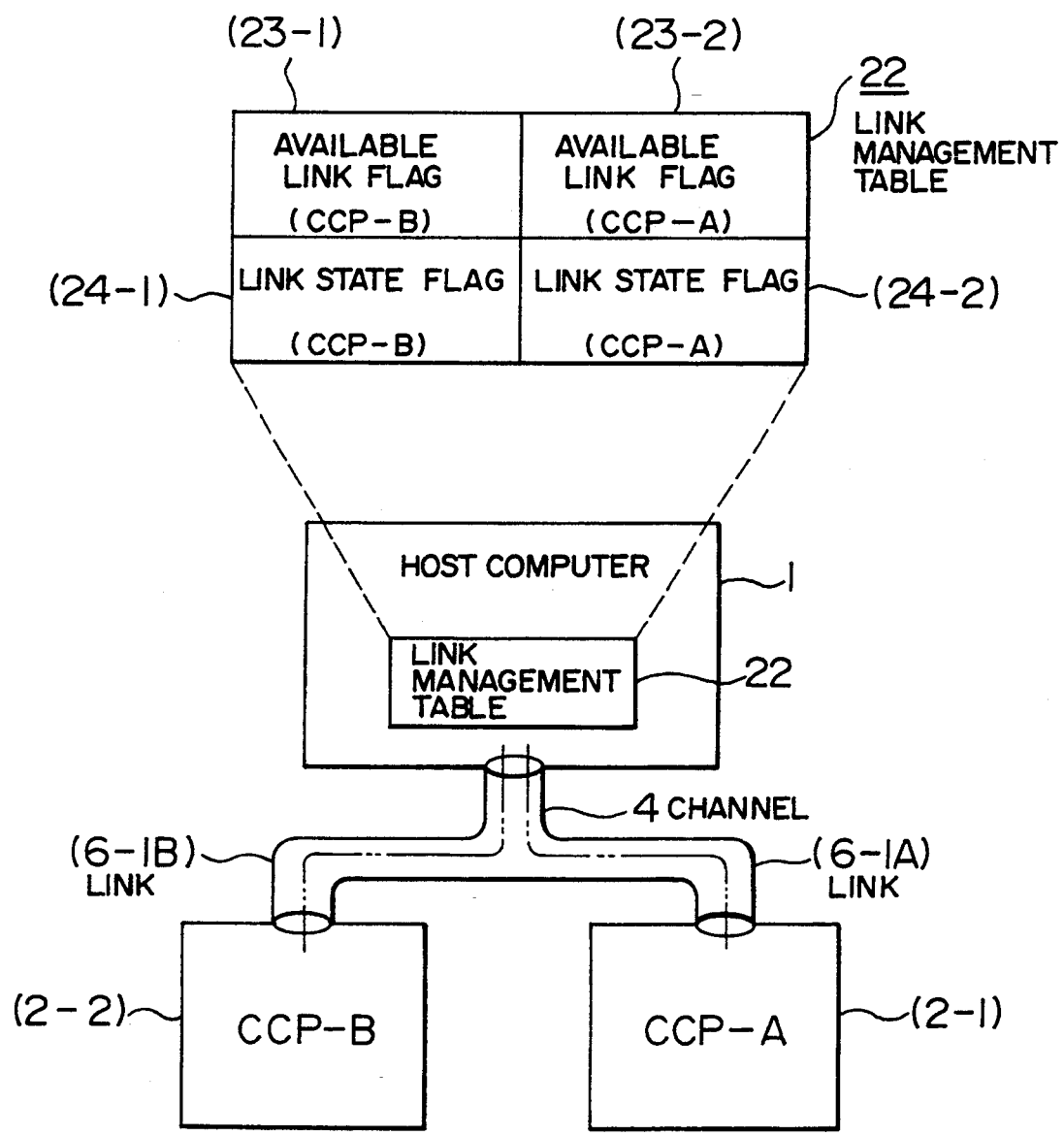
FIG. 7 is a view showing a link management table with respect to the CCPs controlled by the host computer.

The host computer has a link management table 22 as shown in FIG. 7. The link management table includes available link flags 23 and link state flags 24 provided correspondingly to the links connected to the CCPs. An available flag corresponding to the link for connecting between one CCP operated as a regular CCP and one host computer is set to "1". An available flag corresponding to the link for connection to the other CCP is set to "0". When the link is established, the link state flag is set to "1". When the link is released, the link state flag is set to "0". Each of the host computers performs exchange of normal messages with respect to the link in which both the available link flag and the link state flag are set to "1".

Figure 8:
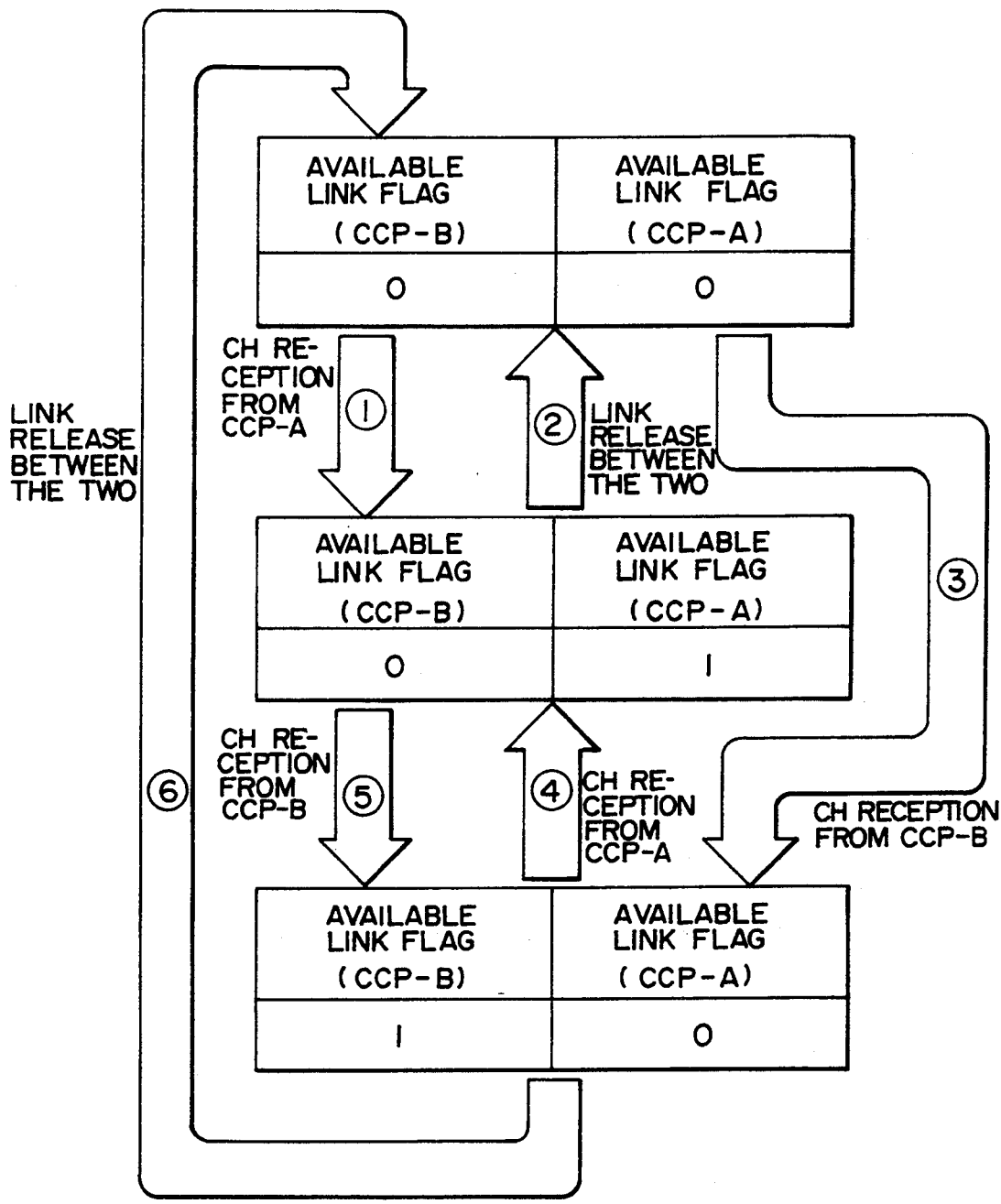
FIG. 8 is a view showing the status changes of the available link flags depicted in FIG. 7.

FIG. 8 shows the change of the state of the available link flags. In the case where both the flags of link states between the host computer and the CCP-A and between the host computer and the CCP-B as shown in FIG. 7 are set to "0" available link flags corresponding to the two links are set to "0". When the respective links are established and then a change output link request (CH) 28 as shown in FIG. 1 is received from the CCP-A, an available link flag corresponding to the link between the host computer and the CCP-A is set to "1" (① or ④ in FIG. 8). When the CH is received from the CCP-B, an available link flag corresponding to the link between the host computer and the CCP-B is set to "1" (③ or ⑤ in FIG. 8). On the contrary, in the case where both the links between the host computer and the CCP-A and between the host computer and the CCP-B are released, available link flags corresponding to the two links are set to "0" (② or ⑥ in FIG. 8).

Method of Monitoring Failure of CCP

Figure 9:
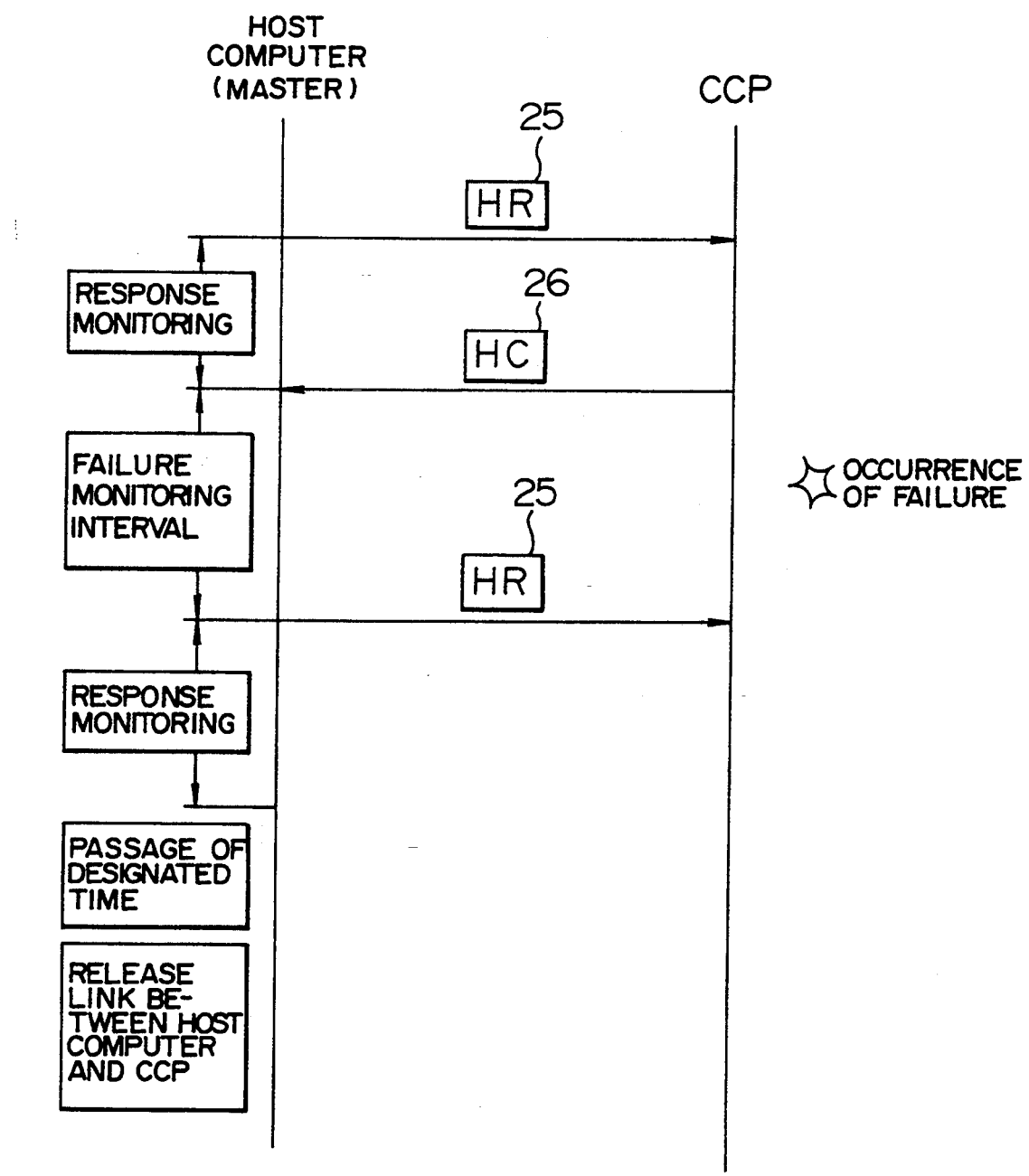
FIG. 9 is a view showing the procedure of monitoring failure of the CCP by the master host computer.

The master host computer monitors failure of the regular and backup CCPs by health check. As shown in FIG. 9, a health check request (HR) 25 is transmitted from the master host computer to the respective CCPs at intervals of a predetermined time. The master host computer monitors the reception of health check confirm (HC) 26 from the respective CCPs in response to the health check request. When the HC is not received from a CCP with the passage of a predetermined time, failure of the CCP is judged to thereby release the link between the host computer and the CCP.

Outline of Backup System

The procedure of switching-over to a backup CCP in case of failure of a regular CCP in the aforementioned configuration according to the present invention will be described with reference to FIG. 1.

When the master host computer detects failure of the CCP-A (serving as a regular CCP) by the aforementioned failure monitoring method, an activate node request (AN) 27 is transmitted to the CCP-B in the case where the link between the host computer and the CCP-B is in an established state (that is, in the case where the CCP-B can be operated). The CCP-B which has received the AN activates itself (as a regular CCP) and sends a change output link request (CH) to all of the host computers to be connected to the CCP-B. Each of the host computers which have received the CH sets the available link flag of the link to the CCP-B (the link which has received the CH) to "1" and sets the available link flag of the link to the CCP-A (forming a counter-part to the CCP transmitting the CH) to "0". Hence, the slave host computer transmits the DR and receives the DC, by which the link to the CCP-A is released.

As a result, the backup CCP can be used as a new regular CCP to perform data exchange. Accordingly, a system of high-speed switching-over to a backup CCP in case of failure of a regular CCP can be provided.

Detailed Procedure in the Backup System

The operating procedure of the host computer and CCP in the backup system according to the present invention will be described below in detail.

Procedure of Initial Setting of the Backup System

Figure 10A:
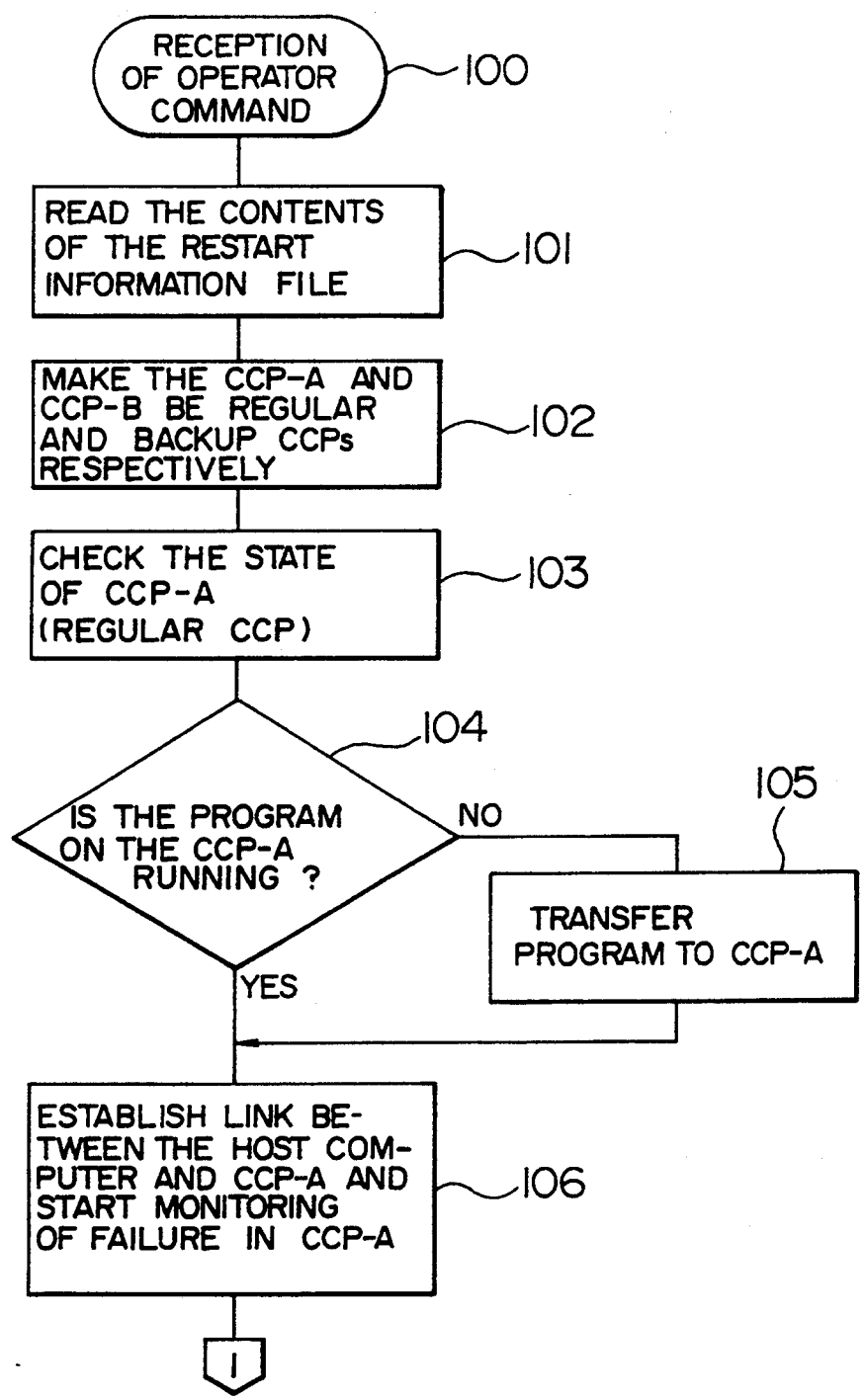
FIGS. 10A and 10B are views showing the procedure of initial setting of the backup system by the master host computer.
Figure 10B:
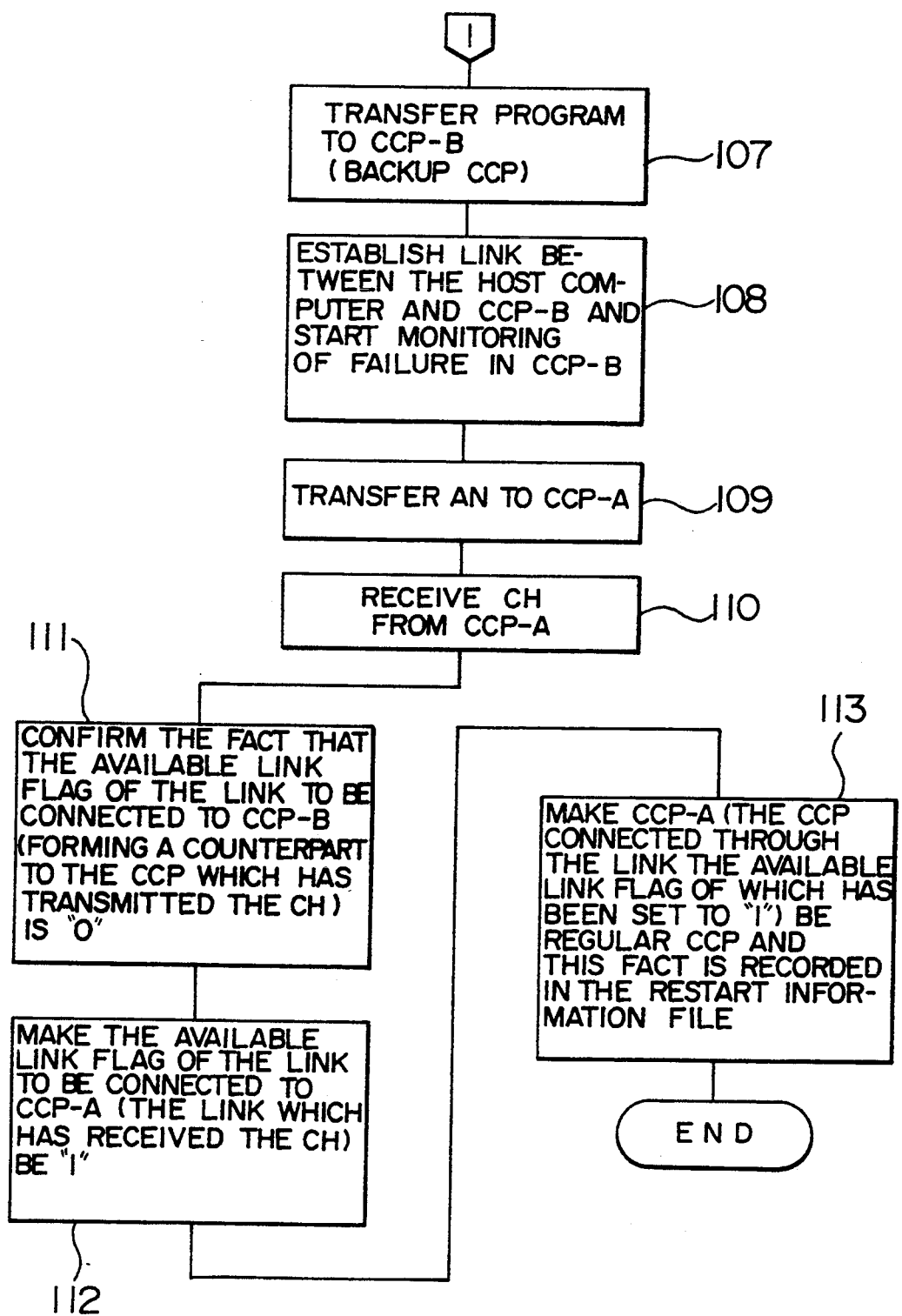
Figure 11:
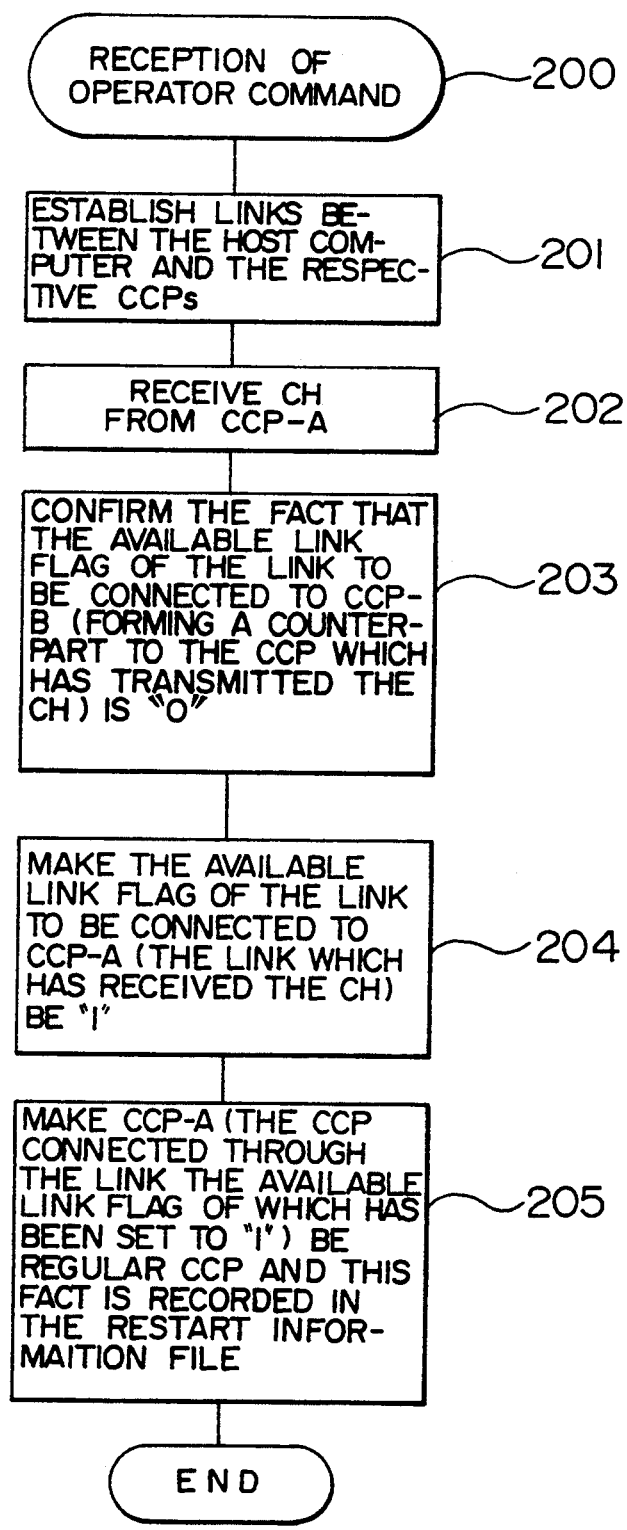
FIG. 11 is a view showing the procedure of initial setting of the backup system by a slave host computer.
Figure 12:
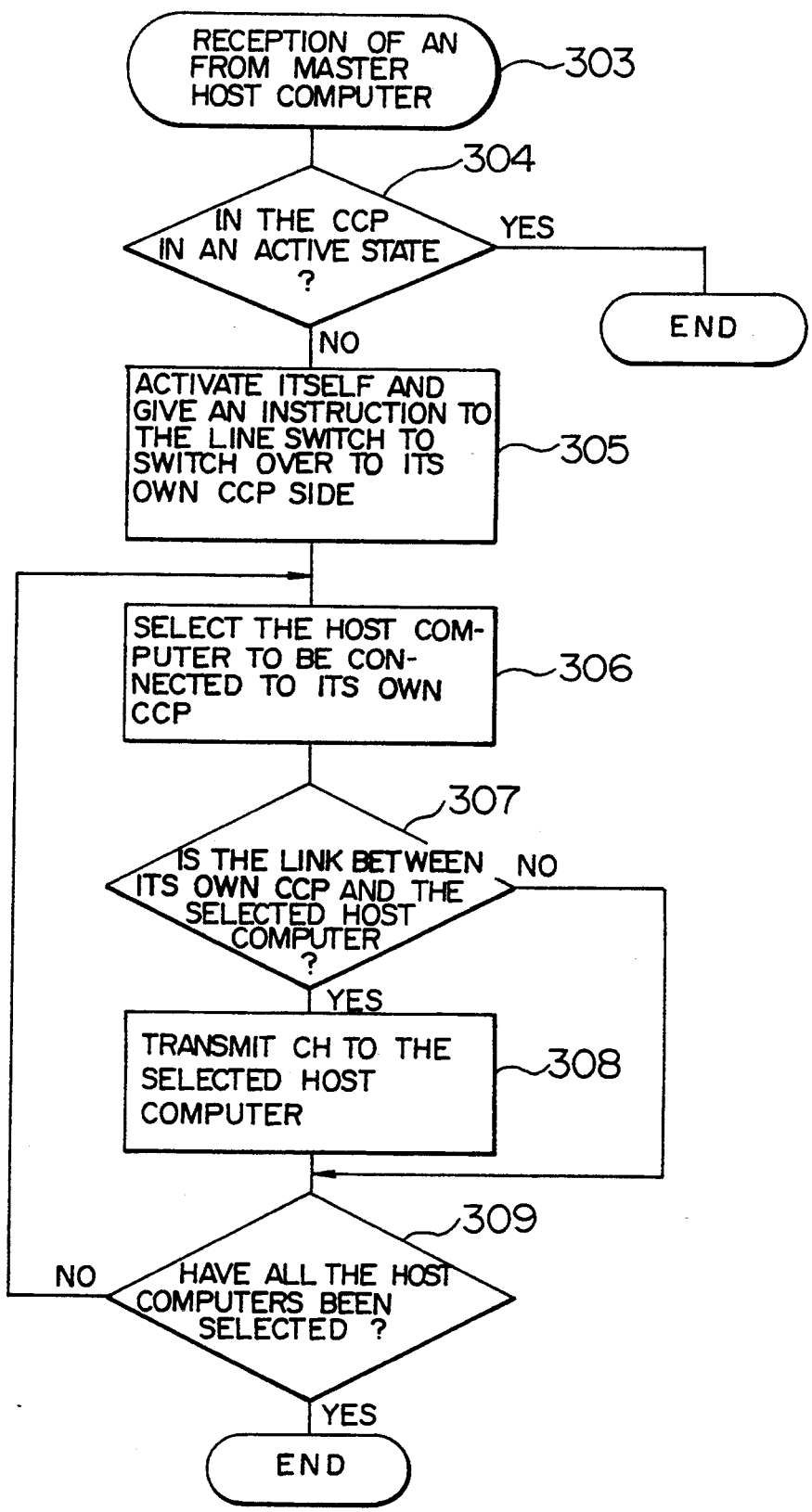
FIG. 12 is a view showing the procedure of the CCP in the case where an activate node request is received from the master host computer.
Figure 13:
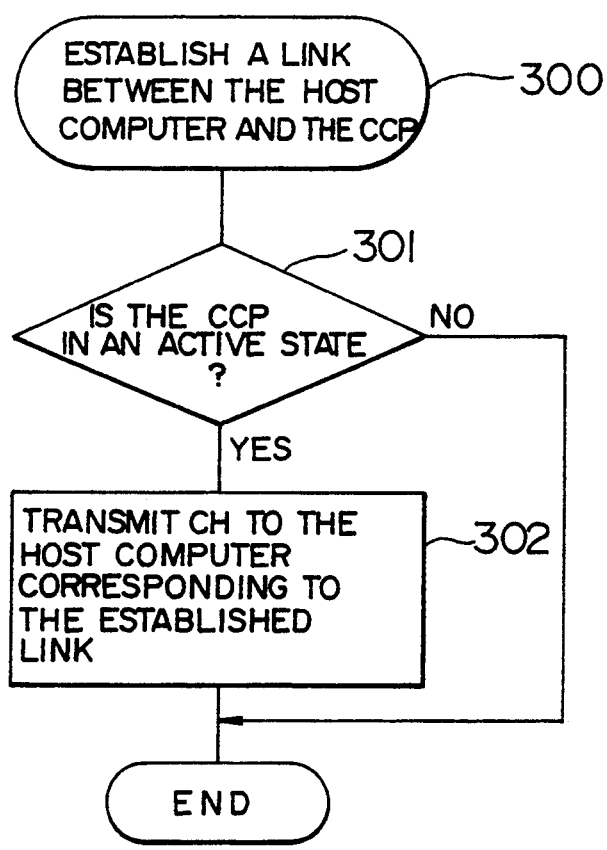
FIG. 13 is a view showing the procedure of the CCP in the case where a host computer-CCP link is established.

A method of initial setting of the backup system in conjunction with the starting of the host computer or CCP in an embodiment of the present invention is now described. FIGS. 10A and 10B show the procedure of initial setting of the backup system by the master host computer. FIG. 11 shows the procedure of initial setting of the backup system by the slave host computer. FIGS. 12 and 13 show the processing procedure of the CCP.

As shown in FIG. 10A, when the master host computer receives an operator command to request the starting of the host computer and CCP (Step 100), the regular/backup state of the respective CCP which has been not yet initialized is read from the restart information file (Step 101). The regular/backup state of the CCP is decided on the basis of the information (Step 102). In FIG. 10A, the CCP-A and the CCP-B are considered to be a regular CCP and a backup CCP, respectively. For example, a SENSE command as described in the HITAC manual "M-series processors", 8080-2-001-50, 58-10, Hitachi, Ltd., is transmitted to the CCP-A (regular CCP). On the basis of the sense byte from the CCP in response to the command, a judgment is made as to whether or not the communication control program is running on the CCP (Step 103). As a result, when the program is not running (Step 104), the master host computer transfers the communication control program to the CCP-A (Step 105). The program transfer to the CCP can be carried out by reading a load module from the directory file of the host computer and transmitting the load module to the CCP. On the other hand, the CCP develops the program to the main storage (15 in FIG. 4). Thereafter, a link between the host computer and the CCP-A is established to start the monitoring of failure of the CCP-A (Step 106).

On the contrary, when the CCP is already active as the result of the CCP status check, a link between the host computer and the CCP-A is established to start the monitoring of failure of the CCP-A without the operation of transferring the communication control program to the CCP (Step 106). On the other hand, when the link between the host computer and the CCP is established as shown in FIG. 13 (Step 300), the CCP is already active (Step 301). Accordingly, the CH (28 in FIG. 1) is transmitted to the host computer corresponding to the established link (Step 302).

The reason why the status of the CCP is checked as described above is in that the CCP disconnected from the host computer may be operated (as a relay node to the other CCP to be connected by communication lines) at the time of the starting of the host computer.

On the other hand, the same program as that for the CCP-A (regular CCP) is forcedly transferred to the CCP-B (backup CCP) to securely keep the CCP-B on standby as a backup CCP (that is, to reset all states) as shown in FIG. 10B (Step 107). After a link between the host computer and the CCP-B is established, failure monitoring is started (Step 108).

Further, the AN 28 as shown in FIG. 1 is transmitted to the CCP-A (regular CCP) after the link is established (Step 109).

As is obvious from the step 106 in FIG. 10A and the step 108 in FIG. 10B, the master host computer is linked with the two CCPs.

As shown in FIG. 12, when the CCP-A is already active, the CCP-A which has received the AN (Step 303) neglects this fact (Step 304). Otherwise, the CCP-A activates itself and gives an instruction to the line switch to switch over to the CCP-A side (Step 305). Thereafter, the CH is transmitted to host computers corresponding to the established state of the like among the all host computers (Steps 306–309).

The master host computer which has received the CH from the CCP-A as shown in FIG. 10B (Step 110) confirms that the available link flag of the link to the CCP-B (forming a counterpart to the CCP transmitting the CH) is "0" (Step 111) (the first CH transmission/reception after the links to the two CCPs are established.). Then, the available link flag of the link (which has received the CH) to the CCP-A is set to "1" (Step 112) (① in FIG. 8). Further, the master host computer records the CCP-A (connected by the link having the available link flag "1") as a regular CCP on the restart information file of the master host computer (Step 113).

On the other hand, when the slave host computer receives an operator command to request the starting of the host computer and the CCP as shown in FIG. 11 (Step 200), links between host computers and two CCPs are established (Step 201). Thereafter, when the CH is received from the CCP-A (regular CCP) (Step 202), the fact that the available link flag of the link to the CCP-B (forming a counterpart to the CCP transmitting the CH) is "0" is confirmed (Step 203) (the first CH transmission/reception after the links to the two CCPs are established). Then, the available link flag of the link (which has received the CH) to the CCP-A is set to "1" (Step 204) (① in FIG. 8). Further, the slave host computer records the CCP-A (connected by the link having the available link flag "1") as a regular CCP on the restart information file of the slave host computer (Step 205).

As described above, the initial setting of the backup system can be perfected. In this system, even when the master or slave host computer is started under the condition that the CCP is already operated, the CCP transmits the CH to the corresponding link in response to the establishing of a link between the host computer and the CCP. Accordingly, the host computer can know the CCP operated as a regular CCP. Consequently, initial setting can be made easily.

Procedure of Switching-over to Backup CCP in Case of Failure of Regular CCP

Figure 14:
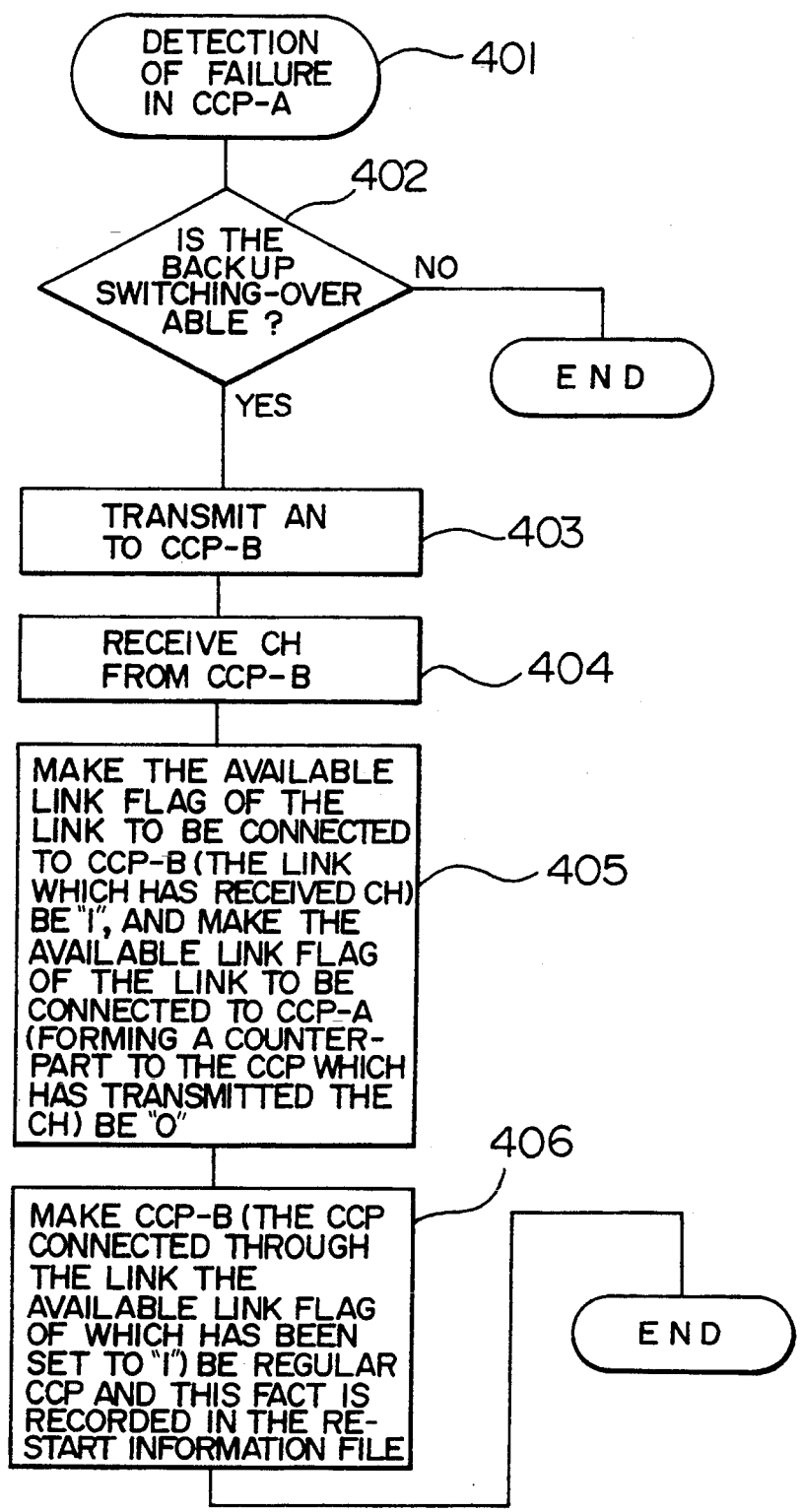
FIG. 14 is a view showing the procedure of switching-over to the backup CCP by the master host computer in case of failure of the regular CCP.
Figure 15:
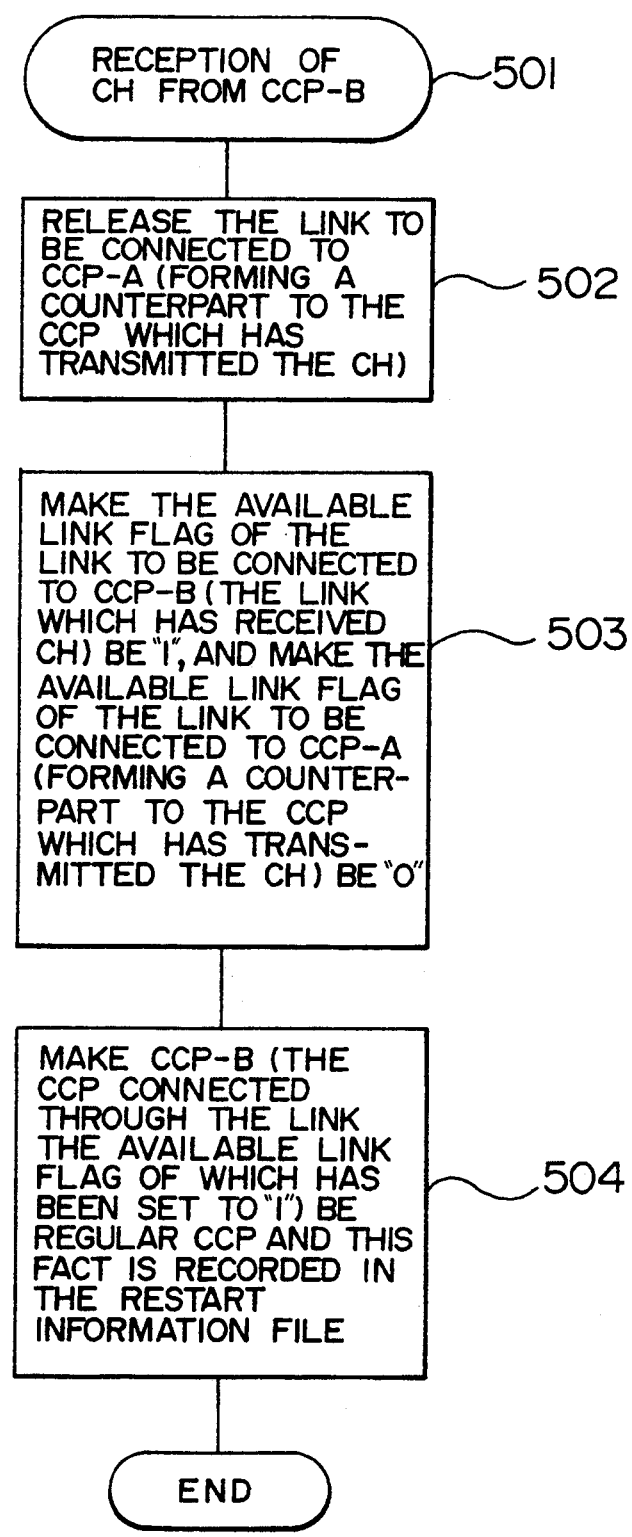
FIG. 15 is a view showing the procedure of switching-over from the regular CCP to the backup CCP by the slave host computer in case of failure of the regular CCP.

In the following, a method of switching-over to a backup CCP in case of failure of a regular CCP in an embodiment of the present invention is described. FIG. 14 shows the procedure of switching-over to a backup CCP by the master host computer. FIG. 15 shows the procedure of switching-over to a backup CCP by the slave host computer. FIG. 12 shows the procedure of the CCP.

As shown in FIG. 14, when the master host computer detects failure of the CCP-A (regular CCP) by the aforementioned failure monitoring procedure (Step 401), a judgment is made as to whether the link between the host computer and the CCP-B (backup CCP) is in an established state (Step 402). When the link is in an established state (that is, when switching-over to the backup CCP can be made), the AN is transmitted to the CCP-B (Step 403).

As shown in FIG. 12, the CCP-B which has received the AN confirms that the CCP is inactive (Step 304), (that is, the CCP-B has never received the AN). The CCP-B activates itself and gives an instruction to the line switch to switch over to the CCP-B side (Step 305). Thereafter, the CH is transmitted to host computers corresponding to the established state of the like among the all host computers connected to the CCP (Steps 306–309).

As shown in FIG. 14, the master host computer which has received the CH from the CCP-B (Step 404) sets the available link flag of the link (which has received the CH) to the CCP-B to "1" and sets the available link flag of the link to the CCP-A (forming a counterpart to the CCP transmitting the CH) to "0" (Step 405) (⑤ in FIG. 8). Further, the master host computer records the CCP-B (connected by the link having the available link flag "1") as a regular CCP on the restart information file of the master host computer (Step 406).

On the other hand, as shown in FIG. 15, the slave host computer which has received the CH from the CCP-B (backup CCP) (Step 501) releases the link to the CCP-A (forming a counterpart to the CCP transmitting the CH) (Step 502). Thereafter, the available link flag of the link (which has received the CH) to the CCP-B is set to "1" and the available link flag of the link to the CCP-A (forming a counterpart to the CCP transmitting the CH) is set to "0" (Step 503) (8 in FIG. 8). Further, the slave host computer records the CCP-B (connected by the link having the available link flag "1") as a regular CCP on the restart information file of the slave host computer (Step 504).

In case where failure occurs in the link between the master host computer and the CCP, the slave host computer cannot recognize the failure. On the other hand, the master host computer can hardly discriminate between the failure of link and the failure of CCP. Accordingly, the aforementioned backup procedure is applied even to these cases.

As described above, a high-speed system of switching-over to a backup CCP can be provided.

Procedure in Case of Failure of Backup CCP

In the following, a backup system in case of failure of the backup CCP in an embodiment of the present invention is described.

When failure occurs in the backup CCP, the failure is detected by the failure monitoring procedure as shown in FIG. 9. At the same time, a failure message is displayed on the operator console.

Accordingly, the operator can take measures to inform a maintenance service man, so that the applicability of the backup system is improved.

Method of Transferring the Recovered CCP into the Backup CCP

Finally, a method of incorporation of the recovered CCP as a backup CCP in an embodiment of the present invention is described.

Figure 16:
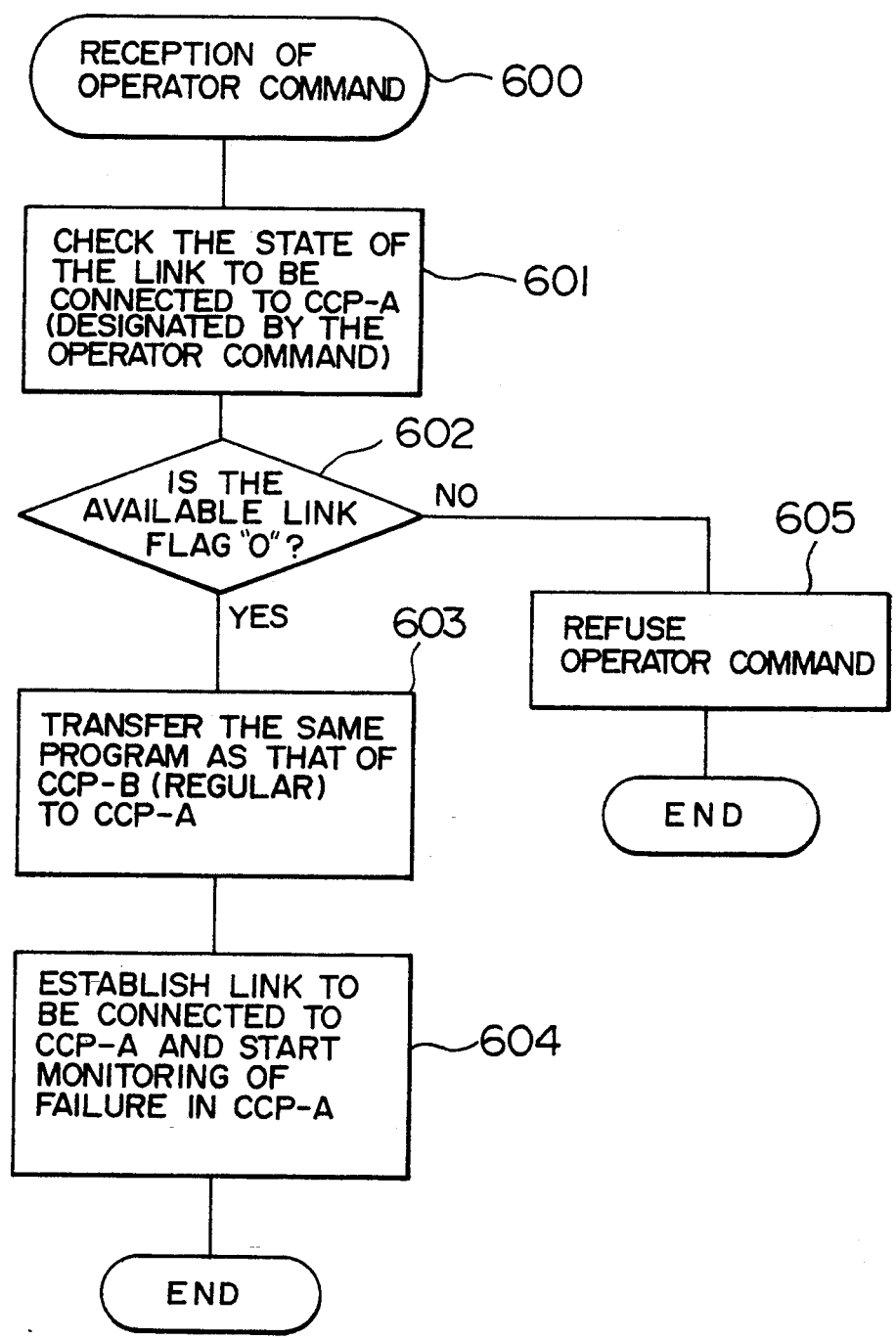
FIG. 16 is a view showing the procedure of incorporation of the recovered CCP into the backup by the master host computer.
Figure 17:
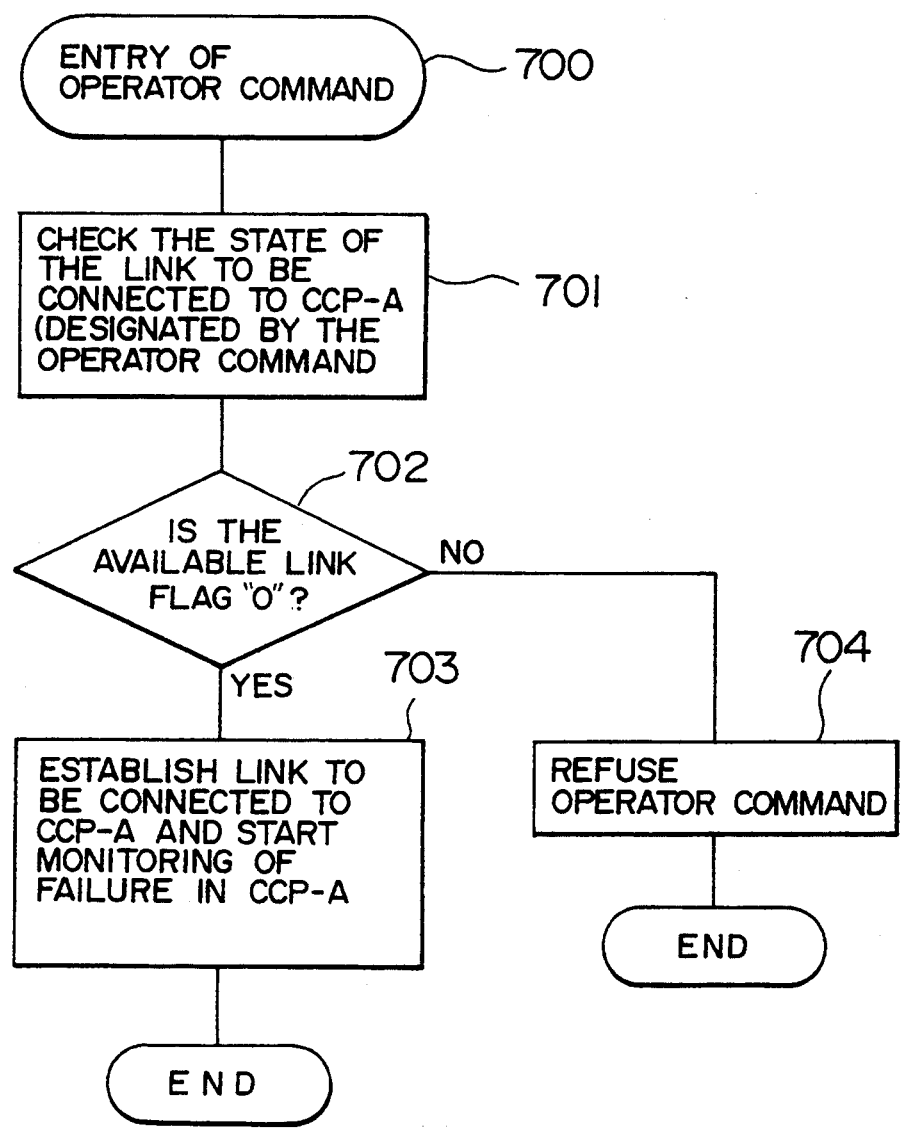
FIG. 17 is a view showing the procedure of incorporation of the recovered CCP into the backup by the slave host computer.

FIG. 16 shows the procedure of incorporation of the recovered CCP as a backup CCP by the master host computer. FIG. 17 shows the procedure of incorporation of the recovered CCP as a backup CCP by the slave host computer. The case where the CCP-A is incorporated as a backup CCP is described below.

As shown in FIG. 16, the master host computer which has received an operator command to request the incorporation of the recovered CCP as a backup CCP (Step 600) checks the available link flag of the link to the CCP-A (designated by the operator command) (Step 601). When the flag is "0" (Step 602), the same program as that for the CCP-B (regular CCP) is transferred to the CCP-A (Step 603). Thereafter, the link between the host computer and the CCP-A is established to start the monitoring of failure of the CCP-A (Step 604).

As shown in FIG. 17, the slave host computer which has received an operator command to require the incorporation of the recovered CCP as a backup CCP (Step 700) checks the available link flag of the link to the CCP-A (designated by the operator command) (Step 701). When the flag is "0" (Step 702), the link between the host computer and the CCP-A is established to start the monitoring of failure of the CCP-A (Step 703).

The reason why the available link flag is checked by the aforementioned procedure is in that the fact that the designated CCP is not operated as a regular CCP should be checked. When the available link flag is "1" as the result of the checking, the operator command is refused.

Accordingly, the CCP recovered from the failure after the switching-over to a backup CCP can be kept on standby as a backup CCP.

Replacement of the Master Host Computer

Further, in the backup system according to the present invention, each of all the host computers has both the restart information file and the directory file (each of all the host computers records the CCP corresponding to the link which has received the CH as a regular CCP whenever the CH is received). Accordingly, even in the case where the master host computer is replaced by a new one because of failure or the like, the operation of the backup system can be continued after the replacement of the master host computer on the basis of an operator command. Even if there is no restart information file, the backup system according to the present invention can be operated.

According to the present invention, the master host computer detecting the failure of the regular CCP functions as a master controller to perform automatic switching-over to a backup CCP without human power. Further, the same program as that for the regular CCP is stored in the backup CCP. Accordingly, the time required for recovery from failure to establish a new link can be shortened.

Further, because the master host computer functions as a main controller, wasteful physical resources such as health-check lines provided between the regular and backup CCPs are not required except the host computers and the CCPs connected to the host computers.

What is claimed is:

1. In a communication system having a plurality of host computers, first and second communication control processors each connected to each of said plurality of host computers through channels, a plurality of communication lines adapted for connection to operatively associated external terminal devices, and a line switch circuit disposed between said first and second communication processors and said plurality of communication lines, wherein a one of said host computers serves as a master host computer and is adapted to activate either one of said first and second communication control processors, a method for automatically switching over said first and second communication control processors comprising the steps of:

(a) establishing first links and second links as logical communication paths between each of said plurality of host computers and said first and second communication control processors, respectively;
   (b) sending an activate node request from said master host computer to said first communication control processor;
   (c) transmitting a change output link request from said first communication control processor, when said first communication control processor has received the activate node request, to each of said plurality of host computers through each of said first links to inform said plurality of host computers that said first communication control processor functions as a regular communication control processor;
   (d) adjusting, by said first communication control processor, said line switch circuit such that said first communication control processor is connected to said plurality of communication lines; and,
   (e) setting, in each of said plurality of host computers, a first available link flag indicating an available/unavailable link state of said first links corresponding to said first communication control processor, to "AVAILABLE" and setting a second available link flag indicating an available/unavailable link state of said second links corresponding to the second communication control processor, to "UNAVAILABLE" in response to the change output link request, by which the first and second communication control processors are established as a regular communication control processor and a backup communication control processor, respectively, wherein each of said plurality of host computers send a message through each of said first links designated by the first available link flag set in each of said host computers as an available link, the regular communication control processor and said line switch circuit to said plurality of communication lines to which the terminal devices are connected.

2. A communication control processor automatically switching-over method according to claim 1, further comprising the steps of:
   (f) monitoring a state of said first communication control processor by said master host computer;
   (g) transmitting the activate node request from said master host computer to said second communication control processor when said master host computer detects failure of said first communication control processor;
   (h) transmitting the change output link request from said second communication control processor, when said second communication control processor has received the activate node request, to each of said host computers to inform that said second communication control processor should function as the regular communication control processor;
   (i) making, by said second communication control processor, said line switch circuit adjust such that said second communication control processor is connected to said plurality of communication lines;
   (j) setting the first available link flag to "UNAVAILABLE" and setting the second available link flag to "AVAILABLE" in each of said host computers in response to the change output link request so that said first and second communication control processors are switched over to a backup communication control processor and a regular communication control processor, respectively, and the respective host computers can send messages through the regular communication control processor and said line switch circuit to said plurality of communication lines to which the terminal devices can be connected.

3. The method according to claim 1 further comprising the steps: when a one of the first links are established between a newly started host computer and said first communication control processor which has already received the activate node request, sending by said first communication control processor the change output link request to said newly started host computer through the established one of said first links, and
   in response to the change output link request from said first communication control processor, sending from the newly started host computer the first available link flag to "AVAILABLE" and setting the second available link flag to "UNAVAILABLE".

4. A communication control processor automatically switching-over method according to claim 1, further comprising the steps of:
   (k) monitoring the state of said second communication control processor by said master host computer; and
   (l) outputting a message to inform of an occurrence of failure, on a console connected to said master host computer when said master host computer detects failure of said second communication control processor.

5. A communication control processor automatically switching-over method according to claim 2, wherein said first communication control processor is switched over to serve as the backup communication control processor when said first communication control processor is recovered from the failure thereof.

6. In a communication system having a plurality of host computers, first and second communication control processors each thereof connected to each of said plurality of host computers through channels, a plurality of communication lines adapted for connection to operatively associated external terminal devices, and a line switch circuit disposed between said first and second communication control processors and said plurality of communication lines, wherein a one of said host computers serves as a master host computer configured to activate either one of said first and second communication control processors, a method of automatically switching over said communication control processors comprising the steps of:

setting said first and second communication control processors respectively to regular and backup communication control processors by said master host computer at a time of starting of said system;

establishing first and second links as logical communication paths between each of said plurality of host computers and said first and second communication control processors, respectively;

adjusting, by said first communication control processor, said line switch circuit whereby said first communication control processor is connected to said plurality of communication lines;

monitoring a state of said first communication control processor by said master host computer;

supplying an activate node request from said master host computer to said second communication control processor when said master host computer detects failure of said first communication control processor as a result of said monitoring;

transmitting a change output link request to each of said plurality of host computers from said second communication control processor supplied with the activate node request, through each of said second links;

adjusting, by said second communication control processor, said line switch circuit whereby said second communication control processor is connected to said plurality of communication lines; and, setting, in each of said plurality of host computers, a first available link flag indicating an available/unavailable link state of said first link corresponding to said first communication control processor to "UNAVAILABLE" and setting a second available link flag indicating an available/unavailable link state of said second link corresponding to said second communication control processor to "AVAILABLE" in response to the change output link request, so that said first and second communication control processors are switched over to a backup communication control processor and a regular communication control processor, respectively, and each of said plurality of host computers send a message through each of said second links designated by the available link flag set in each of said plurality of host computers as an available link, the regular communication control processor and said line switch circuit to said plurality of communication lines to which the terminal devices are connected.

7. A system for automatically switching over communication control processors comprising:

a plurality of host computers, a one serving as a master host computer adapted to activate either one of first and second communication control processors;

said first and second communication control processors each thereof connected to each of said plurality of host computers;

channels for connecting said first and second communication control processors to each of said plurality of host computers;

a plurality of communication lines adapted for connection to operating associated external terminal devices; and a line switch circuit disposed between said first and second communication control processors and said plurality of communication lines, wherein:

each of said plurality of host computers has a first available link flag indicating an available/unavailable link state of said first link corresponding to said first communication control processor, and a second available link flag indicating an available/unavailable link state of said second link corresponding to said second communication control processor;

said master host computer includes means for establishing first and second links as communication paths between each of said plurality of host computers and said first and second communication control processors respectively, on each channel;

said master host computer includes means for supplying an activate node request to said first communication control processor;

said first communication control processor which has received the activate node request includes means for transmitting a change output link request to each of said host computers through each of said first links to inform that said first communication control processor should function as a regular communication control processor;

said first communication control processor includes means for causing said line switch circuit to adjust such that said first communication control processor is connected to said plurality of communication lines; and each of said host computers includes means for setting the first available link flag corresponding to said first link to "AVAILABLE" and setting the second available link flag corresponding to said second link to "UNAVAILABLE" in response to the change output link request so that said first and second communication control processors are set to a regular communication control processor and a backup communication control processor, respectively, and each of said host computers include means for sending a message through each of said first links designated by the first available link flag set in each of said host computers as an available link, the regular communication control processor and said line switch circuit to said plurality of communication lines to which the terminal devices are then connected.

8. A communication control processor automatically switching-over system according to claim 7, wherein:

said master host computer monitors a state of said first communication control processor;

said master host computer supplies the activate node request to said second communication control processor when said master host computer detects failure of said first communication control processor;

said second communication control processor transmits the change output link request, when said second communication control processor has received the activate node request, to each of said host computers to inform that said second communication control processor should function as the regular communication control processor; and each of said host computers sets the first available link flag to "UNAVAILABLE" and sets the second available link flag to "AVAILABLE" in response to the change output link request, so that said first and second communication control processors are switched over to a backup communication control processor and a regular communication control processor, respectively, and the respective host computers can send messages through the regular communication control processor and said lines to which the terminal devices can be connected.

9. The system according to claim 7, wherein the first communications control processor includes means for sending when the first link is established between a newly started host computer and said first communication control processor which has already received the activate node request, the change output link request to said newly started host computer through the established first link.

10. A communication control processor automatically switching-over system according to claim 8, wherein:

said master host computer outputs a message to report an occurrence of failure on a console connected to said master host computer when said master host computer detects failure of said second communication control processor.

11. A communication control processor automatically switching-over system according to claim 8, wherein:

said first communication control processor is switched over to serve as the backup communication control processor when said first communication control processor is recovered from the failure thereof.

12. A system for automatically switching over communication control processors comprising:

a plurality of host computers, a one serving as a master host computer adapted to activate either one of first and second communication control processors;

said first and second communication control processors each thereof connected to each of said plurality of host computers;

channels for connecting said first and second communication control processors to each of said plurality of host computers;

a plurality of communication lines adapted for connection with operatively associated external terminal devices; and a line switch circuit disposed between said first and second communication control processors and said plurality of communication lines, wherein:

each of said host computers has a first available link flag indicating an available/unavailable link state of said first link corresponding to said first communication control processor, and a second available link flag indicating an available/unavailable link state of said second link corresponding to said second communication control processor;

said master host computer includes means for setting said first and second communication control processors at a time of starting of said system;

said plurality of host computers include means for establishing first and second links as logical communication paths between each of said plurality of host computers and said first and second communication control processors respectively, on each channel;

said first communication control processor includes means for adjusting said line switch circuit such that said first communication control processor is connected to said plurality of communication lines;

said master host computer includes means for monitoring a state of said first communication control processor;

said master host computer includes means for supplying an activate node request to said second communication control processor when said master host computer detects failure of said first communication control processor as a result of said monitoring;

said second communication control processor includes means for transmitting a change output link request to said respective host computers, when said second communication control processor receives the activate node request;

said second communication control processor includes means for adjusting said line switch circuit such that said second communication control processor is connected to said plurality of communication lines; and each of said host computers includes means for setting the first available link flag to "UNAVAILABLE" and setting the second available link flag to "AVAILABLE" in response to the change output link request, so that said first and second communication control processors are switched over to serve as the backup communication control processor and the regular communication control processor, respectively, and each of said host computers include means for sending a message through each of said second links designated by the second available link flag set in each of said host computers, the regular communication control processor and said line switch circuit to said plurality of communication lines to which the terminal devices are to be connected.

* * * * *